United States Patent [19]

Lyman

[11] 4,080,553
[45] Mar. 21, 1978

[54] ELECTRIC MOTOR SYSTEM
[75] Inventor: Joseph Lyman, Kennebunk, Me.
[73] Assignee: Cambridge Thermionic Corporation, Cambridge, Mass.
[21] Appl. No.: 695,507
[22] Filed: Jun. 11, 1976
[51] Int. Cl.² .......................................... H02K 29/00
[52] U.S. Cl. .................................... 318/138; 318/254
[58] Field of Search ................ 308/10, 156, 184, 268; 318/138, 254

[56] References Cited

U.S. PATENT DOCUMENTS

| | | | |
|---|---|---|---|
| 3,377,113 | 4/1968 | Wilson | 308/10 |
| 3,779,618 | 12/1973 | Soglia | 308/10 |
| 3,845,995 | 11/1974 | Wehde | 308/10 |
| 3,954,310 | 5/1976 | Rava | 308/10 |

Primary Examiner—Herman J. Hohauser
Attorney, Agent, or Firm—Thomas M. Ferrill, Jr.; Allen V. Hazeltine

[57] ABSTRACT

An electric motor system comprising a rotor including permanent magnets providing a plurality of correspondingly directed magnetic poles angularly displaced around said rotor, a stator comprising first and second windings adapted to cooperate with the poles of said rotor, each of said windings having transversely disposed conductive portions for intercepting the magnetic fields of said poles during rotation of said rotor, and an amplifier having its input coupled to said first winding so as to be energized by alternating voltage induced in said first winding during rotation of said rotor, and having its output coupled to said second winding to supply alternating current therethrough in synchronism with the interception of the magnetic fields of said poles by the transverse portions of said second winding. A motor system in accordance with the invention is capable of achieving extremely high speeds of rotation particularly when the rotor structure is suspended by means of magnetic bearings well known in the art. Provision for limiting the speed of operation of the motor may be made comprising a low-pass filter included in the feedback path from the first winding to the second winding. Also provision may be made for initiating rotation of the rotor, which may comprise Hall effect sensors disposed adjacent to the transverse portions of the first winding, the outputs of which are combined and supplied to the input of the amplifier to cause alternating current to be supplied to the second winding to initiate rotation of the rotor.

14 Claims, 11 Drawing Figures

ELECTRIC MOTOR SYSTEM

This invention relates to electric motors and motor systems. In particular it relates to such systems in which an electric motor can be caused to operate at extremely high speeds—i.e., of the order of one hundred thousand rpm or greater.

While not limited in its application, the invention is particularly adapted for use with brushless motors of the type comprising a rotor, including magnetic means providing a plurality of correspondingly directed magnetic poles angularly displaced around the rotor, a stator comprising a winding having transverse portions for intercepting the magnetic fields of said poles during rotation of said rotor, and means for supplying to said winding an alternating voltage for energizing the winding and determining the speed of rotation of the rotor.

An object of the invention is to provide an improved electric motor system.

A further object is to provide a brushless motor system capable of operating with a direct voltage and capable of very high rotational speeds.

Another object is to provide maximum simplicity of commutation in an electric motor.

Another object is to obtain the advantages of regenerative commutation in a motor.

In accordance with the invention, the foregoing objects are achieved, in a brushless motor of the sort above described, by providing a further stator winding which also includes transverse portions for intercepting the magnetic fields of said poles for deriving a suitably phased voltage which is supplied to the input of an amplifier. The output of the amplifier then provides the alternating voltage for energizing the main winding of the motor. Thus there is provided a regenerative commutation system which can be utilized to cause the speed of the motor gradually to increase to any desired value subject only to limitations imposed by friction in the motor structure. If the motor is provided with essentially frictionless bearings, such as the magnetic suspension type well known in the art, exceedingly high speeds of motor operation can readily be obtained. If desired, means may be provided for limiting the speed of the motor, for example by inclusion of a low-pass filter in series with the feedback circuit including the amplifier.

The invention will be fully understood from consideration of the following detailed description thereof with reference to the accompanying drawings in which.

Figure 1:
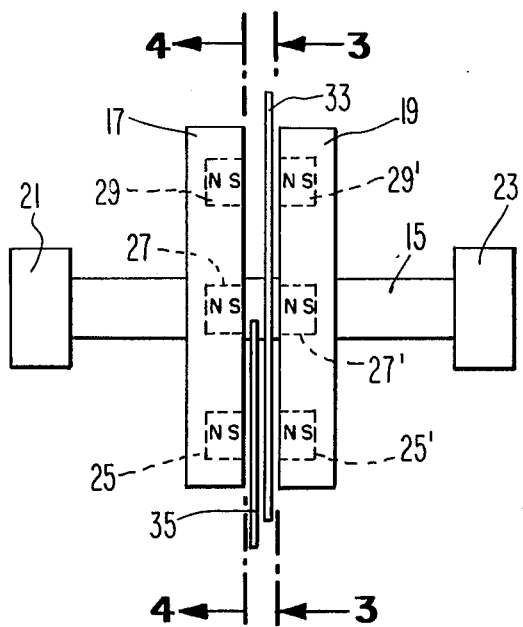
FIG. 1 is a side view of one embodiment of the physical structure involved in the present invention.
Figure 2:
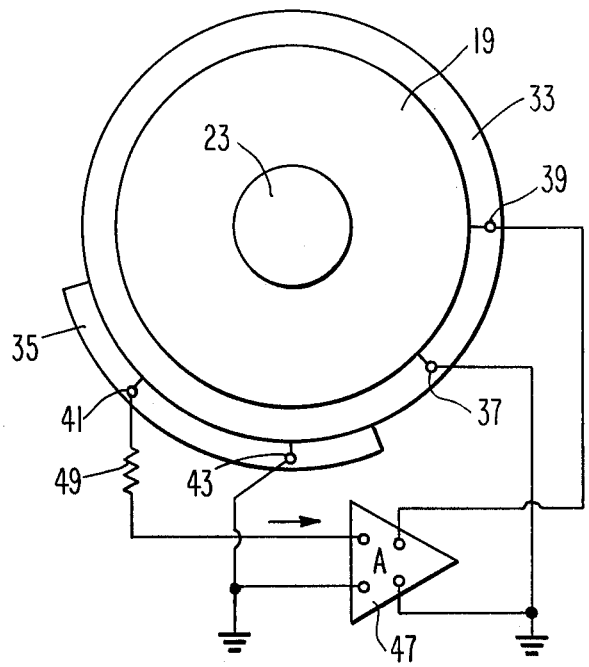
FIG. 2 is a diagram showing the basic circuitry for sustaining rotation of the motor structure which is shown in side view in FIG. 1 and in end view in FIG. 2.

Referring now to FIGS. 1 and 2, a rotor comprising a shaft 15 having two flywheel cylinder bodies 17 and 19 thereon extends between two bearings 21 and 23. Bodies 17 and 19 may be made of brass or other suitable non-magnetic material. Preferably the bearings 21 and 23 are magnetic suspension units which may be made in accordance with the principles of my U.S. Pat. Nos. 3,243,238 granted Mar. 29, 1966, 3,472,852 granted Oct. 21, 1969, 3,498,016 granted Jan. 20, 1970, 3,565,495 granted Feb. 23, 1971 and 3,860,300 granted Jan. 14, 1975.

Figure 4:
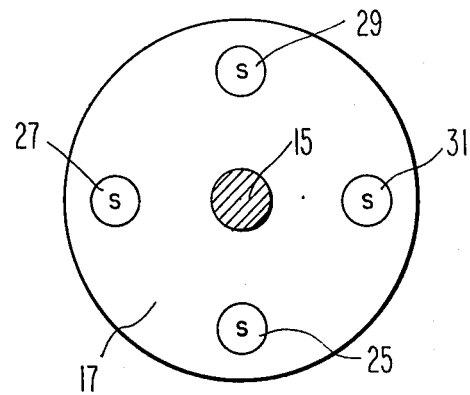

Permanent magnet elements are arranged in at least one and preferably both of the bodies 17 and 19. These elements may be separate individual magnets of samarium cobalt, four such magnets 25, 27, 29 and 31 being included in cylindrical body 17 (FIGS. 1 and 4) and companion magnets 25', 27', 29' and 31' being provided in cylindrical body 19. These four pairs of magnets are disposed at 90° intervals around the bodies 17 and 19.

Magnets 25, 27, 29 and 31 and their primed counterparts in body 19 are shown as extending less than the full axial extent of these bodies. However, they may be axially coextensive with the bodies 17 and 19, they may if desired project beyond the flush positioning shown, and they may if desired even be non-magnetized permeable rod ends associated with axial permanent magnet means in the shaft and/or a permanent magnetic plate at the ends of the elements opposite the gap between the bodies 17 and 19. Whether the elements 25, 27, 29 and 31 and their primed counterparts in body 19 are separate individual magnets or are permeable rod elements associated with permanent magnets, they present like poles in the face of one rotor body (e.g. body 17) and the opposite poles in the face of the other body 19.

Figure 3:
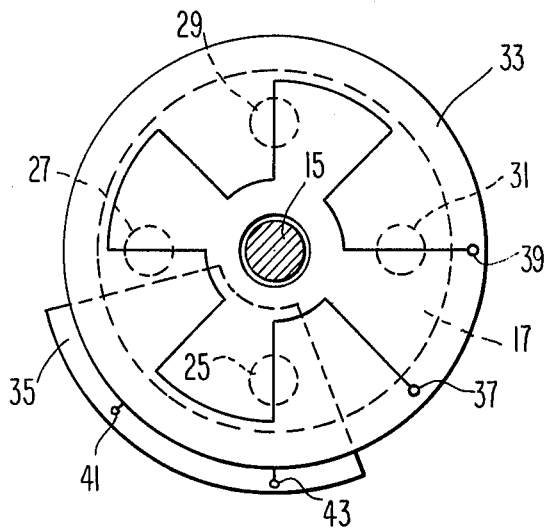
FIGS. 3 and 4 are sectional views taken on the section planes shown at 3—3 and 4—4, respectively, in FIG. 1.
Figure 5:
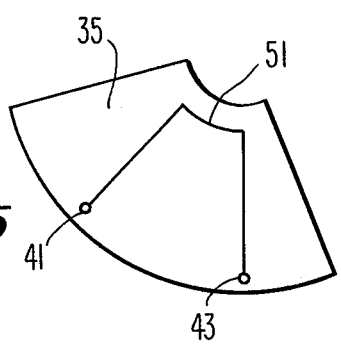
FIG. 5 is a diagrammatic showing of the sector plate of FIG. 3.

Between bodies 17 and 19 are interposed two dielectric plates, one of which may be circular plate 33 and the other of which may be a sector plate 35. Each of these plates is provided with an electrical conductor forming at least one loop. A conductor path configuration suitable for plate 33 is shown in FIG. 3, terminals being at 37 and 39. A conductor path configuration suitable for plate 35 is shown in FIG. 5, its terminals being at 41 and 43.

The stators of bearings 21 and 23 and the plates 33 and 35 are fixedly mounted. For this purpose, the plates 33 and 35 may be secured to mounting lugs by screws (not shown) inserted in the peripheral region of each plate.

To impart movtive power to the rotor, current is caused to pass through the driving conductor in one direction between terminals 37 and 39 when the positioning of the conductor legs relative to the magnets is as shown in FIG. 3, and is caused to pass through the conductor in the opposite direction between terminals 37 and 39 when the rotor has moved 45° from that position, a further drive current reversal occurring with every 45° of rotation. Thus, an alternating voltage wave, which may be a sine wave, is provided having four cycles per revolution of the rotor in the case of a rotor having four magnetic pole positions. Of course, it will be appreciated that other numbers of pole elements could be provided, for example six pole elements in a rotor body, distributed at 60° angles. In that case, there would be six cycles of alternating drive voltage per revolution.

In accordance with my invention, the alternating voltage for application between terminals 37 and 39 is provided by the output of an amplifier 47 (FIG. 2), the input of the amplifier 47 being provided by the conductive loop on the sector plate 35. A current-limiting resistor 49 may be included in the input circuit to amplifier 47.

Assuming that the rotor has been started in rotation by any suitable means, an alternating voltage is induced in the conductive loop 51 between terminals 41 and 43, the frequency and phase of this alternating voltage being the same as required for the driving current to be supplied by the amplifier 47 to the driving conductor terminals 37 and 39. The resultant amplifier output, with its current reversals so timed as to impart consistent unidirectional torque to the rotor, tends not only to sustain the rotation of the rotor but to accelerate it. This system has demonstrated its capability of driving a rotor at speeds as high as 90,000 R.P.M. (i.e. 1500 revolutions per second). The frequency of the signal being amplified and reintroduced into the motor stator in the case of a four-pole rotor configuration at 90,000 rpm is 6000 Hertz (6000 cycles per second).

The operation of the motor can be explained by reference to FIG. 3. When the drive current is flowing from terminal 39 through the conductor configuration to terminal 37, the current paths in the regions of maximum magnetic field strength, i.e. in the regions adjacent the pole faces, are each directed radially inward. The four drive reactions thus produced are in the same direction, i.e. in the direction for counterclockwise drive as seen in FIG. 3.

When the rotor has advanced through 45°, the poles will be situated adjacent the other four of the eight radial or spoke-like portions of the drive plate winding configuration. If the current had persisted in the same direction, i.e. from terminal 39 to terminal 37, the current in the radial conductor portions adjacent the poles would now be directed radially outward, causing torque in opposition to the first-described torque. But since the current direction has reversed in 45° of rotation by virtue of the input conductor configuration between terminals 41 and 43, the drive current direction at the output of amplifier 47 has synchronously reversed by virtue of the 45° advancement of the rotor, and the direction of the drive torque is preserved.

As will be apparent, the two radial legs of the conductor loop 51 on the sector plate 35 (FIG. 5) alternate in the predominant contributions of induced voltage. This results in the alternations being produced as required in the input voltage to the amplifier 47.

Figure 6:
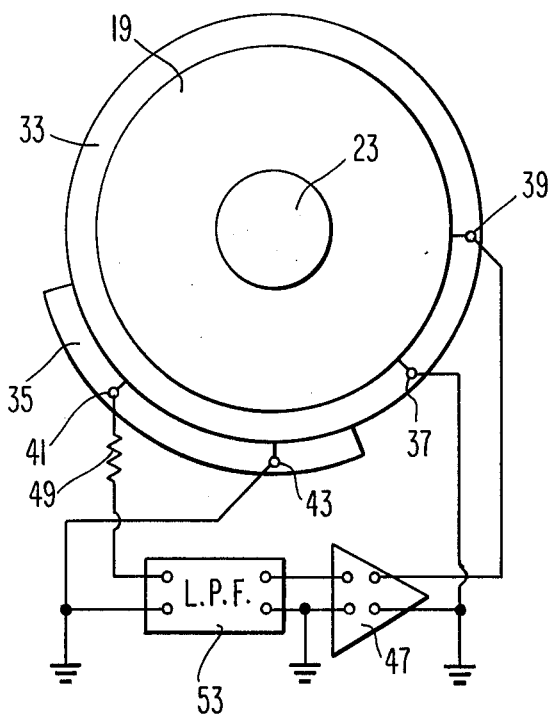
FIG. 6 is a modification of the circuit diagram of FIG. 2.

The amplitude of the drive current tends to increase as the speed increases. Accordingly, any suitable means for limiting the drive current may be provided. One way to predetermine the speed limit is by inserting a low-pass filter 53 in the amplified feedback loop between the signal pickup loop and the drive winding, as shown in FIG. 6. Since the frequency is directly proportional to speed, the low-pass filter limits the attainable speed by causing the drive current amplitude to be substantially reduced as the filter cutoff frequency is reached, stabilizing the drive speed.

Figure 7:
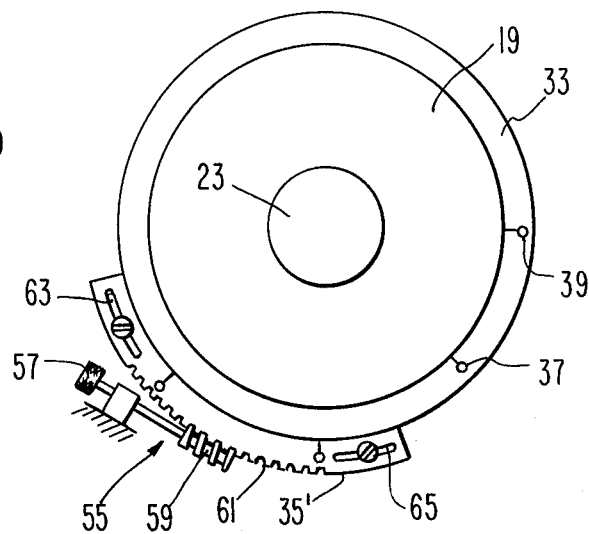
FIG. 7 is a diagrammatic representation of a phase adjuster for the sector plate of FIG. 3.

A refinement which may be introduced is means for adjusting the relative angular positions of plates 33 and 35 as shown in FIG. 7. For this purpose, the sector plate 35' may be provided with a worm screw angle adjuster 55 consisting of a knurled knob 57 and worm 59 engaging worm gear teeth 61 on the sector 35'. The sector may be supported by screws in arcuate slots 63 and 65 to admit of the angular adjustability.

Figure 8:
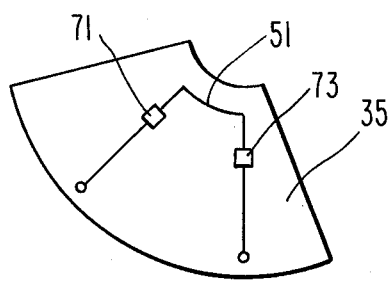
FIG. 8 is a diagrammatic showing of inclusion of Hall effect sensors on the sector plate.

In order to cause the rotor to commence rotating, it may be frictionally engaged by a motor driven element, or may be subjected to a rotating field for inducing rotation by eddy current reaction. A preferable way to accelerate the rotor to an adequate initial speed is by reliance on Hall effect sensors. Two such sensors 71 and 73 are shown included on the sector plate 35 in FIG. 8, one adjacent each of the radial legs of the input induction loop 51. These two sensors 71 and 73 are sensed oppositely to each other.

Figure 9:
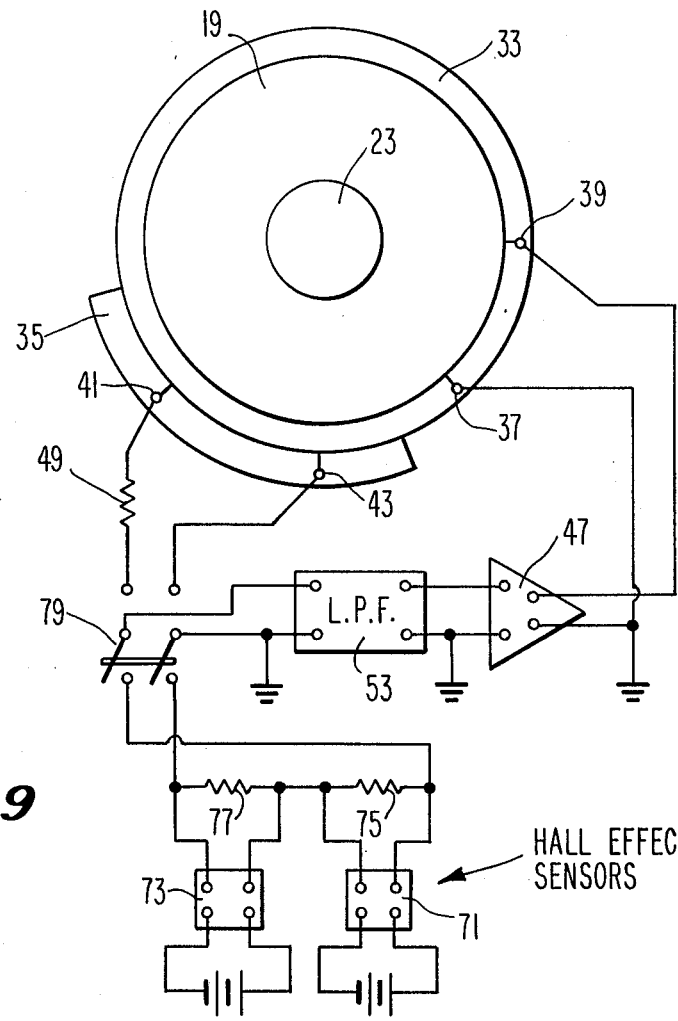
FIG. 9 is a diagram of a version of the motor circuit including Hall effect starting means.

The Hall effect sensors 71 and 73 are connected in a circuit as shown in FIG. 9. An energizing battery is connected to each of these sensors. The output terminals of sensor 71 are connected across a resistor 75 and the output terminals of sensor 73 are connected across a resistor 77. These resistors are connected to apply a voltage according to the algebraic sum of outputs of sensors 71 and 73 to one of the pairs of the terminals of double-pole switch 79. The opposite pair of terminals of the switch, for the opposite throw, is connected to resistor 49 and to terminal 43. For starting the motor, the arms of the double throw switch 79 are connected to the lower terminals to couple the opposed outputs of the Hall effect sensors either through a low-pass filter 53 or directly to the input of the amplifier 47 having its output circuit connected to the drive winding.

The Hall effect sensors provide differential net outputs which reverse with each 45° of angular advancement of the rotor. They are not dependent upon rotor motion for generation of the needed voltage. The amplifier 47 is direct coupled, whereby it provides driving power which commences with a direct-current output state, until the rotor commences its rotation.

As the rotor comes up to a moderate speed, the switch 79 is thrown to engage its upper terminals and place reliance on the voltage induced between terminals 41 and 43 by the motion of the rotor and its magnetic fields relative to the conductor loop between said terminals.

As will be readily apparent, the switching means schematically shown as a double-pole, double-throw switch may if desired be the armature switching means of a relay, the coil of which may be actuated by a well-known speed responsive arrangement such as a rectifier fed through a high-pass filter by the output of amplifier 47, to provide the throw from the lower to upper contact position and thereby obviate any manual switching. Alternatively, in the event of application of the system to a motor with conventional bearings and a switch operated by centrifugal forces, such a speed responsive switch, may be used to control a double-throw switching relay or may be arranged with its own double-throw switching arms.

Figure 10:
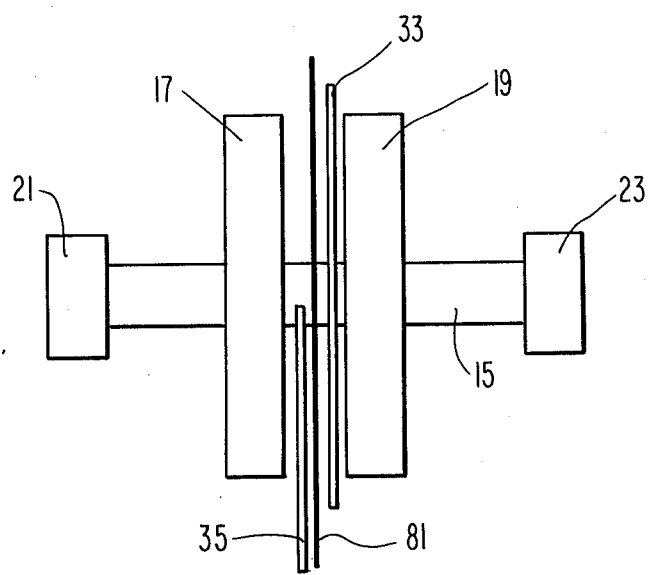
FIG. 10 is a modification of the structure of FIG. 1 with shielding between the pickup and drive windings.

The arrangement of elements shown in FIG. 1 permits some inductive coupling from the drive winding back to the magnetic induction loop on the sector plate 35. This inductive coupling may be minimized if desired by interposing a conductive shield member 81 between the plates 33 and 35 as shown in FIG. 10. This fixed shield plate 81 may be used for a stabilizing contribution as well as the minimizing of inductive coupling, in accordance with the principles of U.S. Pat. No. 3,929,390 to Paul Simpson, granted Dec. 30, 1975.

Figure 11:
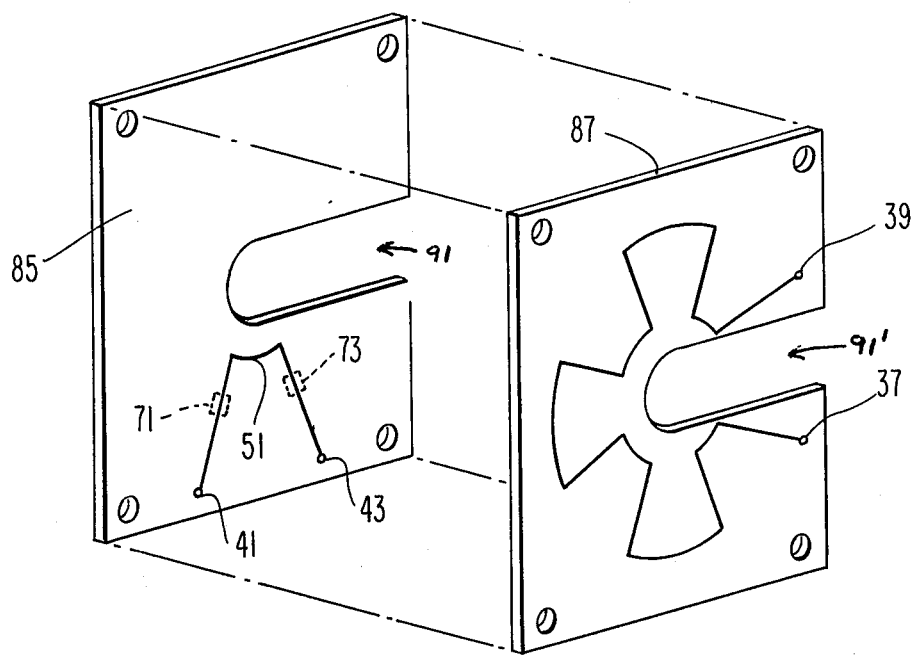
FIG. 11 is an exploded view of a sandwich of substrates arranged for ease of assembly for full support for the windings of the motor.

Referring to FIG. 11, in which is shown an exploded view of a sandwich construction for the stator of the motor adapted for ease of assembly, the inductive signal pickup loop 51 is shown fixed on one square insulating substrate 85 and the drive winding on another square insulating substrate 87. Mounting holes are shown in the corners of these substrates. Additional insulating and protective plates may if desired be included in the stator sandwich, and a shield, which may be a disc or a segmental member, may be interposed between the pickup loop and the drive winding. The conductors may be fixed upon the substrate surfaces or may be deposited in grooves formed in the substrates. It will be apparent that a single substrate may be used with the pickup loop formed on one of its sides and the drive winding formed on the other.

Among the applications for the present invention are centrifuges and gyroscopic instruments. For extremely high rotational speeds, the instrument may be enclosed in an evacuated housing. This, together with use of magnetic suspension bearings, provides minimized friction.

There is no reason why the input induction loop for the amplifier input must have only two radial conductor legs. It may have plural conductor legs in the same general manner as the winding on the driving plate 33.

The conductors on plates 33 and 35 may be embedded in said plates or may be formed on one or both surfaces of each plate. Where relative angular adjustability between the input winding and the drive winding is not desired, the input winding and the drive winding may be constructed in a single sandwich, in which a shield may be interposed between the windings if desired.

It also will be recognized that in constructing a sandwich of the input and output windings to be inserted between the bodies 17 and 19, radial slots 91 and 91' from the periphery to the central clearance opening for shaft 15 may be provided. With reference to FIG. 11, such a slot would pass between terminals 37 and 39.

In each of the embodiments illustrated, the magnetic pole elements are each directed parallel to the axis, for cooperation with the windings spaced in the direction parallel to the axis from said magnetic pole elements. It will be recognized that the magnetic pole elements may instead be directed radially outward to cooperate with conductor patterns on adjacent cylindrical surfaces.

In each of the embodiments, the pickup loop provides regenerative feedback, by way of rotation of the rotor and the localized magnetic fields carried thereby, from the drive winding which receives the amplifier output. Thus, the revolving rotor is made a part of a regenerative commutation system wherein there is no need for brushes or other contact elements.

While the invention has been described with reference to a preferred embodiment and certain modifications thereof, it will be apparent that other modifications may be made therein within the scope of the invention as defined by the following claims.

I claim:
1. An electric motor system comprising:
    (a) a rotor including magnetic means providing a plurality of $n$ correspondingly directed magnetic poles angularly displaced around said rotor at intervals of $360°/n$
    (b) a stator comprising first and second windings adapted to cooperate with the poles of said rotor, each of said windings having transversely disposed conductive portions for intercepting the magnetic fields of said poles during rotation of said rotor, and
    (c) an amplifier having its input coupled to said first winding so as to be energized by alternating voltage induced in said first winding during rotation of said rotor, and having its output coupled to said second winding to supply alternating current therethrough in synchronism with the interception of the magnetic fields of said poles by the transverse portions of said second winding, whereby said amplifier operates to energize said second winding under control of the alternating voltage supplied to its input from said first winding.

2. A system according to claim 1 in which said transverse portions of said windings are radially disposed with respect to the axis of said stator.

3. A system according to claim 1 in which said transversely disposed portions of said second winding are so interconnected as to cause current to flow in opposite directions in adjacent ones of said portions.

4. A system according to claim 1 in which said first winding comprises a pair of transversely disposed portions respectively disposed adjacent the transverse portions at least one adjacent pair of transverse portions of said second winding.

5. A system according to claim 1 in which said second stator winding comprises a plurality of $2n$ radially disposed conductive portions, conductors interconnecting the outer ends of said radial portions in all but one of alternate pairs of adjacent radial portions, conductors interconnecting the inner ends of said radial portions in alternate pairs of adjacent radial portions intermediate those radial portions whose outer ends are interconnected, thereby to provide a continuous winding having terminals at the outer ends of said adjacent radial portions which are not directly interconnected.

6. A system according to claim 5 in which said first stator winding comprises a pair of radial portions respectively disposed adjacent the radial portions of adjacent pairs of radial portions of said second winding whose inner ends are interconnected.

7. A system according to claim 1 in which said rotor comprises a disc of non-magnetic material having permanent magnet elements inserted therein to form said magnetic poles.

8. A system according in claim 1 in which said rotor comprises a pair of spaced discs of non-magnetic material each having permanent magnet elements inserted therein to form said magnetic poles and complimentary magnetic poles.

9. A system according to claim 8 in which said stator windings are disposed in the space between said rotor discs.

10. A system according to claim 1 including current limiting means in the input circuit to said amplifier.

11. A system according to claim 1 including frequency-selective filter means in the amplifying path between said first and second windings for limiting the amplitude as a function of frequency of the alternating current supplied to said second winding through said path, thereby to limit the speed of said motor.

12. A system according to claim 1 including means for angularly adjusting the position of said first winding relative to said second winding to control the phase of the alternating voltage supplied from said first winding to said amplifier input.

13. A system according to claim 1 including means for initiating rotation of said rotor, said means comprising a pair of oppositely-sensed Hall effect sensors respectively disposed adjacent different transverse portions of said first winding, means for algebraically combining the outputs of said sensors, and means for supplying said combined outputs to the input of said amplifier to cause alternating current to be supplied to said second winding to initiate rotation of said rotor.

14. A system according to claim 1 including a conductive shield interposed between said first and second windings to minimize inductive coupling therebetween.

* * * * *